(12) United States Patent
Lange et al.

(10) Patent No.: US 10,998,800 B2
(45) Date of Patent: May 4, 2021

(54) METHOD OF MANUFACTURING A ROTOR AND ELECTRIC MACHINE

(71) Applicant: RHEINISCH-WESTFÄLISCHE TECHNISCHE HOCHSCHULE (RWTH) AACHEN, Aachen (DE)

(72) Inventors: Tobias Lange, Aachen (DE); Rik W. De Doncker, Leuven (BE); Mareike Schenk, Aachen (DE); Stefan Koschik, Aachen (DE)

(73) Assignee: RHEINISCH-WESTFÄLISCHE TECHNISCHE HOCHSCHULE (RWTH) AACHEN, Aachen (DE)

( * ) Notice: Subject to any disclaimer, the term of this patent is extended or adjusted under 35 U.S.C. 154(b) by 905 days.

(21) Appl. No.: 15/523,258

(22) PCT Filed: Oct. 29, 2015

(86) PCT No.: PCT/EP2015/002165
§ 371 (c)(1),
(2) Date: Oct. 20, 2017

(87) PCT Pub. No.: WO2016/066270
PCT Pub. Date: May 6, 2016

(65) Prior Publication Data
US 2018/0062487 A1  Mar. 1, 2018

(30) Foreign Application Priority Data
Oct. 30, 2014 (EP) .................... 14191083

(51) Int. Cl.
*H02K 15/02* (2006.01)
*H02K 1/02* (2006.01)
(Continued)

(52) U.S. Cl.
CPC ......... *H02K 15/024* (2013.01); *C21D 9/0068* (2013.01); *H02K 1/02* (2013.01);
(Continued)

(58) Field of Classification Search
CPC ...... C21D 9/0068; C21D 8/1294; H02K 1/02; H02K 15/02; Y10T 29/49012
See application file for complete search history.

(56) References Cited

U.S. PATENT DOCUMENTS

| 4,621,794 A | 11/1986 | Kokai et al. |
| 5,684,352 A * | 11/1997 | Mita ........................ H02K 1/02 |
| | | 310/152 |

(Continued)

FOREIGN PATENT DOCUMENTS

| DE | 102008054284 A1 | 5/2010 |
| WO | 2008006719 A1 | 1/2008 |

(Continued)

OTHER PUBLICATIONS

ISA European Patent Office, International Search Report Issued in Application No. PCT/EP2015/002165, dated Feb. 16, 2016, WIPO, 4 pages.

*Primary Examiner* — Livius R. Cazan
(74) *Attorney, Agent, or Firm* — McCoy Russell LLP

(57) ABSTRACT

The invention relates to a method of manufacturing a rotor for an electric machine, wherein the rotor is composed of at least one electric sheet wherein at least one electric sheet is thermally treated regionally to directly modify its magnetic permeability in the treated region.

10 Claims, 9 Drawing Sheets

(51) Int. Cl.
  *C21D 9/00* (2006.01)
  *H02K 15/12* (2006.01)
  *H02K 1/24* (2006.01)

(52) U.S. Cl.
  CPC .............. *H02K 1/246* (2013.01); *H02K 15/02* (2013.01); *H02K 15/12* (2013.01); *Y10T 29/49012* (2015.01)

(56) References Cited

U.S. PATENT DOCUMENTS 6,547,846 B1 * 4/2003 Westin .................. C21D 8/005
  419/28
2011/0316368 A1   12/2011 Dajaku

FOREIGN PATENT DOCUMENTS

WO    2014125104 A2   8/2014
WO    2014125104 A3   8/2014

* cited by examiner

METHOD OF MANUFACTURING A ROTOR AND ELECTRIC MACHINE

CROSS-REFERENCE TO RELATED APPLICATION

The present application is a U.S. National Phase of International Patent Application Serial No. PCT/EP2015/002165, entitled "METHOD FOR PRODUCING A ROTOR AND AN ELECTRIC MACHINE," filed on Oct. 29, 2015. International Patent Application Serial No. PCT/EP2015/002165 claims priority to European Patent Application No. 14191083.6, filed on Oct. 30, 2014. The entire contents of each of the abovementioned applications are hereby incorporated by reference in their entirety for all purposes.

TECHNICAL FIELD

The invention relates to a method of manufacturing a rotor for an electric machine, wherein the rotor is composed of at least one electric sheet.

BACKGROUND AND SUMMARY

The rotor of an electric machine is produced from magnetically conductive sheet metal, also called electric sheet, in a conventional machine design. The magnetic permeability of the sheet metal is considered as homogeneous with the exception of stamping effects and laser cuts at edges of the laminations. However, stray fluxes, i.e. unwanted flux components during the operation of the machine, cannot always be avoided since the metal sheets also have to satisfy mechanical demands. The occurrence of these stray fluxes is unwanted independently of the actual machine type, i.e. independently of whether the rotor is intended for a synchronous machine, reluctance synchronous machines or an asynchronous machine.

Reluctance synchronous machines are used due to their high robustness and due to the high efficiency in particular at high speeds. Since webs for the mechanical stabilization of the rotor are taken into account in reluctance synchronous machines, substantial magnetic stray fluxes arise here. The magnetic conductivity of the rotor is maximized to maximize the magnetic exploitation of the iron material and to minimize the power excitation. This has the result that the webs equally represent good magnetic conductors. The webs are typically minimized down to the mechanical load limit to reduce this magnetically unwanted effect. Further improvements are currently not possible.

First approaches in research projects pursue explicit damage to the material by laser cutting, which is in particular expensive in mass production and which signifies a high time effort. It is therefore desirable to identify alternative methods of rotor production that do not require a laser cutting.

In a similar manner to the reluctance machine, subharmonic field components also arise in synchronous machines having concentrated windings such a with a 12 slot/10 pole machine due to the magnetomotive force (MMF) distribution. Said subharmonic field components generate high losses in the rotor due to the high penetration depth in the material at a low frequency. The magnetic losses are specifically decisively determined hereby. To avoid losses, flux barriers can be worked into the rotor that substantially reduce the subharmonic field components. A method of segmenting and reducing subharmonic field components is already known from DE 10 2008 054 284 A1.

Unwanted stray fluxes can likewise occur with specific rotor geometries for asynchronous machines, in particular with designs in which the required conductors are received by rotor slots. With machines of smaller power classes, the introduction of the conductors frequently takes place using injection molding processes with aluminum or copper, with closed rotor slots being preferred for this purpose to simplify the injection molding process. In addition, a closed rotor slot increases the mechanical strength that is in particular required for machines of high speeds such as spindle drives or cutters. A closed rotor slot, however, also disadvantageously increases the stray flux of the field in an electromechanical manner in comparison with open rotor slots, in particular by the resulting web that the closed slot forms. The breakdown torque of the asynchronous machine is disadvantageously reduced by the stray flux. If a closed rotor slot is necessary due to the mechanical or technical production demands, the stray flux path can initially not be influenced by design interventions.

A method of thermally treating a permanent magnet rotor is known from U.S. Pat. No. 5,684,352. In this respect, regions around the rotor shaft should be directly demagnetized to optimize the torque behavior of the machine. After the thermal heating, the total lamination is cooled in water so that an austenite lattice is formed.

A similar method is known from WO 2008/006719 A1 that thermally treats regions of the laminations around the rotor shaft specifically. The aim of this method is the use of magnetically conductive rotor shafts.

A further method is known from WO 2014/125104 that likewise proposes a thermal treatment of a rotor laminated stack.

The underlying object of the invention comprises identifying a suitable manufacturing method that is suitable to reduce the disadvantageous stray flux effects during the machine operation.

This object is achieved by a method of manufacturing a rotor for an electric machine, wherein the rotor is composed of at least one electric sheet and at least one electric sheet is thermally treated regionally to directly modify its magnetic permeability in the treated region, and wherein rotor sections adjacent to the treated region are cooled during the thermal treatment. The method in accordance with the invention now provides that a rotor produced from at least one electric sheet is thermally treated in regions to directly modify the magnetic permeability of the electric sheet in the treated region. The saturation field strength for this region is in particular also thereby considerably reduced.

The unwanted occurrence of stray fluxes in these regions can be reduced or even prevented by the direct modification of the magnetic conductivity of the electric sheet at the relevant points of the metal sheet. The machine operation can thereby be optimized overall, which is shown, for example, by an increase in the efficiency of the machine, i.e. by an increase in the resulting torque with a constant power consumption or a reduction in the current with a constant torque.

The rotor is typically stamped from an electric sheet, with individual laminations subsequently preferably being stacked in the axial direction.

Depending on the rotor type, the desired rotor geometry is prepared by the production of cut-outs, for example in the form of flux barriers or slots, in particular by stamping. In the resulting rotor geometry, webs or slots are created in the region of the flux barriers that result in unwanted stray paths due to the magnetic conductivity of the electric sheet. The direct thermal treatment of these formed webs can decisively disturb the arising stray effects.

The torque development of a machine decisively depends, for example, on the machine flux and the stray fluxes within the machine. In reluctance synchronous machines, a stray flux path arises due to the rotor configuration over webs in the flux barrier region that are, however, required for the mechanical stabilization of the rotor. Since these webs likewise comprise the soft magnetic material due to the stamping procedure, they are characterized by good magnetic conductivity so that the disadvantageous stray flux paths extend over the webs. These scatter paths are effectively disturbed by the reduction of the magnetic permeability in the web region. The required magnetic permeability can be efficiently achieved by a punctiform or regional thermal treatment of the webs.

The same applies with a rotor geometry for asynchronous machines in which closed slots are used for the reception of the conductor bars. The closed slots of the rotor geometry likewise form corresponding webs of the soft magnetic material at the rotor periphery that previously led to the unwanted stray flux paths. The effect of the stray fluxes can be reduced by a direct treatment of these formed webs at the rotor periphery so that the motor operation can be optimized in total.

Subharmonic field components that effect high losses in the rotor due to the high penetration depth in the material at a low frequency also arise in synchronous machines due to the magnetomotive force distribution. These effects can also be effectively combated and minimized by a direct thermal treatment of the used electric sheet at predefined points.

The modification of the magnetic permeability is achieved by a thermally induced change of the crystal structure of the electric sheet used. A transition from a crystal structure having higher magnetic conductivity into a crystal structure having smaller conductivity is preferably enforced by a controlled heat effect on the region to be treated. The structure is transitioned into a modified crystal lattice in accordance with the iron-carbon diagram by a subsequent cooling, in particular by running through a thermal process, of the treated lamination. The region to be treated is preferably greatly heated over a predefined period to time and is subsequently quenched, in particular while observing the critical cooling rate.

Water, to which corresponding additives may optionally be admixed that change the surface tension of the water, inter alia serves the cooling or passing through of the thermal profile. Oil, a salt bath, aqueous polymer solutions (e.g. polyvinylpyrrolidone), air or gases, e.g. nitrogen or argon, are conceivable as further quenching media.

The desired magnetic properties are preferably achieved when the rotor region to be treated is heated to at least 900°, preferably at least 1000°, ideally to a temperature range between 900° and 1100°, to convert the crystalline structure of the electric sheet into an austenite lattice. The temperature range is dependent on the alloy used for the electric sheet. The temperature range given is optimized for Si steel (i.e., silicon steel).

To avoid damage to the remaining rotor structure, adjacent rotor sections whose permeability should not be modified are cooled during the thermal treatment in accordance with the invention.

The invention furthermore relates to a rotor for an electric machine, in particular to a synchronous machine, a synchronous reluctance machine or an asynchronous machine, wherein the rotor consists of at least one electric sheet that is characterized by a different magnetic permeability in specific regions; webs of the rotor geometry that are formed are in particular characterized by a differing permeability, in particular a smaller permeability. The rotor in accordance with the invention is ideally manufactured in accordance with the method in accordance with the invention or in accordance with an advantageous embodiment of the method such that the same advantages and properties result for the rotor as for the method in accordance with the invention.

In addition to the rotor, the present invention additionally relates to an electric machine, in particular to a synchronous machine, a synchronous reluctance machine or an asynchronous machine having a rotor in accordance with the present invention. Due to the dependency on the rotor in accordance with the invention, it is obvious that the above-discussed advantages and properties of the rotor or of the method apply without restriction to the behavior of the electric machine so that a description is omitted to avoid repetition. By a differing, in particular smaller permeability. The rotor in accordance with the invention is ideally manufactured in accordance with the method in accordance with the invention or in accordance with an advantageous embodiment of the method such that the same advantages and properties result for the rotor as for the method in accordance with the invention.

In addition to the rotor, the present invention additionally relates to an electric machine, in particular to a synchronous machine, a synchronous reluctance machine or an asynchronous machine having a rotor in accordance with the present invention. Due to the dependency on the rotor in accordance with the invention, it is obvious that the above-discussed advantages and properties of the rotor or of the method apply without restriction to the behavior of the electric machine so that a description is omitted to avoid repetition.

Further advantages and properties of the invention will be described in more detail in the following with reference to a plurality of drawings.

DETAILED DESCRIPTION

The torque development of a machine decisively depends on the machine flux and the stray fluxes within the machine. A stray flux path over webs that are required for the mechanical stabilization of the rotor arises in the reluctance synchronous machines and in the permanent magnet synchronous machines due to the rotor configuration. These webs are typically defined by the mechanical load and are unwanted to this degree in the magnetic design of the machine. The aim has previously been to configure the webs in as narrow and thin a manner as possible so that the stray flux path is minimized. Since the rotors are stamped out of an electric sheet, the unwanted webs are also very good magnetic conductors. The web can be narrowed to reduce the scatter flux, which reduces the mechanical capacity, however. In this invention, the reduction of the magnetic permeability is the selected approach to effectively disturb these stray paths.

This can be achieved by a punctiform thermal treatment of these webs. The rotor webs are greatly heated for this purpose, for example via flame, induction heating, and resistive heating by current or contact heat and are subsequently cooled by running through a thermal profile.

Figure 1:
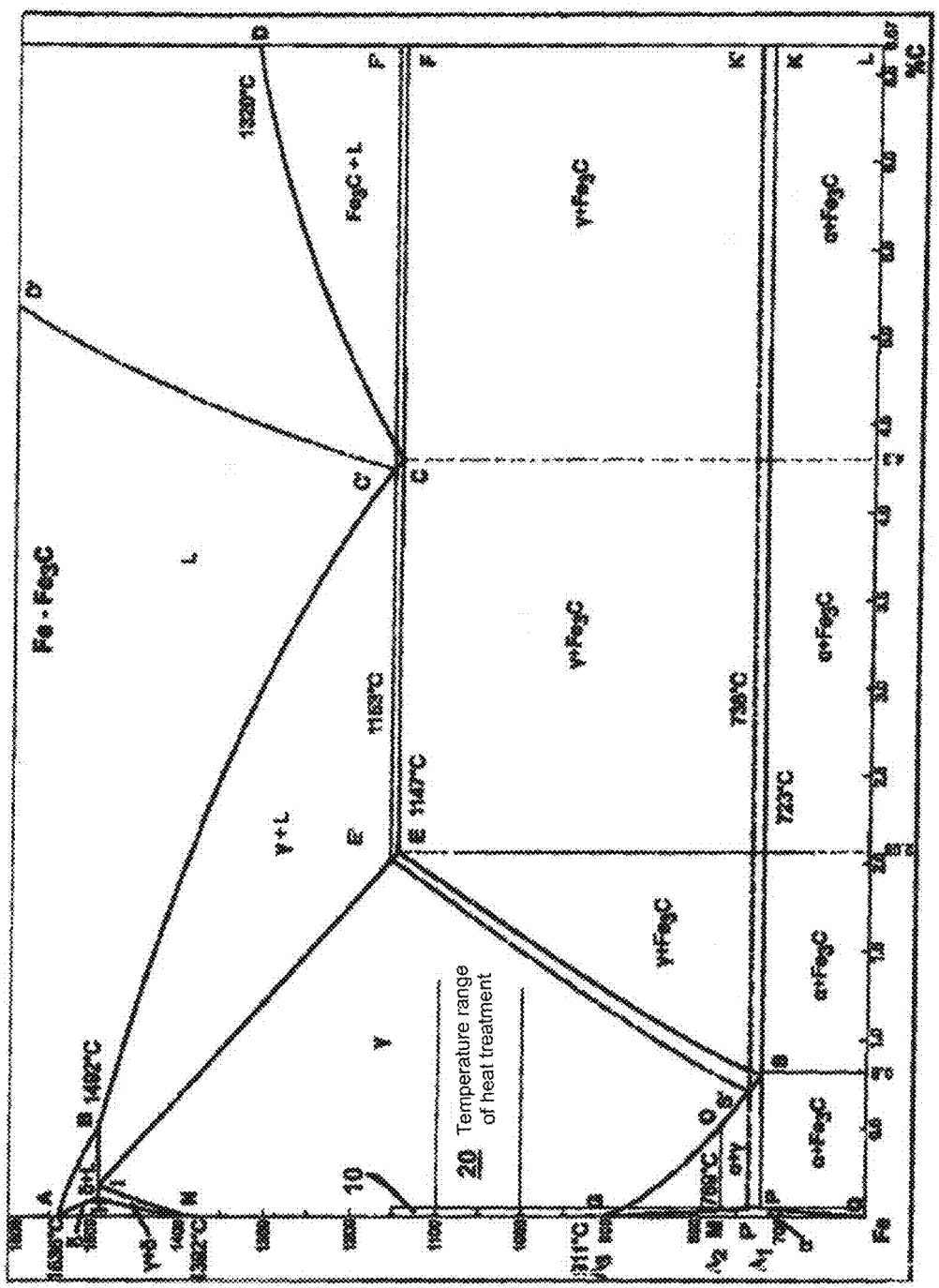
FIG. 1 shows an iron-carbon diagram of steels.

Reference to FIG. 1 is made to illustrate the phase composition in iron to the iron-carbon diagram that represents an equilibrium diagram for the binary system iron-carbon from which the phase composition can be read in dependence on the carbon content and on the temperature. The mass percentages of the carbon are applied to the x axis, the temperature to the y axis. The lines represent the break points or kink points displaced with respect to other temperatures and delineate the individual phase fields from one another. The significant points are marked by letters.

The series of lines ABCD represents the liquidus line above which the alloy is liquid; the series of lines AHIECF corresponds to the solidus line beneath which the alloy is completely solidified. The alloy has a paste-like consistency in the temperature interval between the liquidus temperature and the solidus temperature and comprises remaining melt, δ-iron, γ-iron and cementite (Fe3C) in changing concentrations and proportions. If the liquidus line is fallen below during the cooling of the alloy, the primary crystallization from the melt begins.

Different phases form in dependence on the carbon content due to the different allotropic modifications of the iron. The iron forms different interstitial solid solutions, δ-solid solutions, γ-solid solutions and α-solid solutions with different solubilities for carbon. The electric sheet used for the rotor manufacture is in the range with pure ferrite, that is α-ferrite that is marked by reference numeral 10 in the diagram illustration.

The thermal treatment of the rotor webs takes place at a temperature within the temperature range 20 that is between 1000° and 1100° Celsius. During the thermal treatment (e.g. martensite hardening), the crystal structure of the electric sheet is converted in the treated sections in the martensite structure, the bainite structure or an austenite-ferrite structure. The crystal structure have a very small magnetic permeability and a lower saturation field strength in contrast to a pure α-lattice (ferrite). The magnetic resistance is thus greatly reduced in the webs and the stray flux is minimized.

Figure 2:
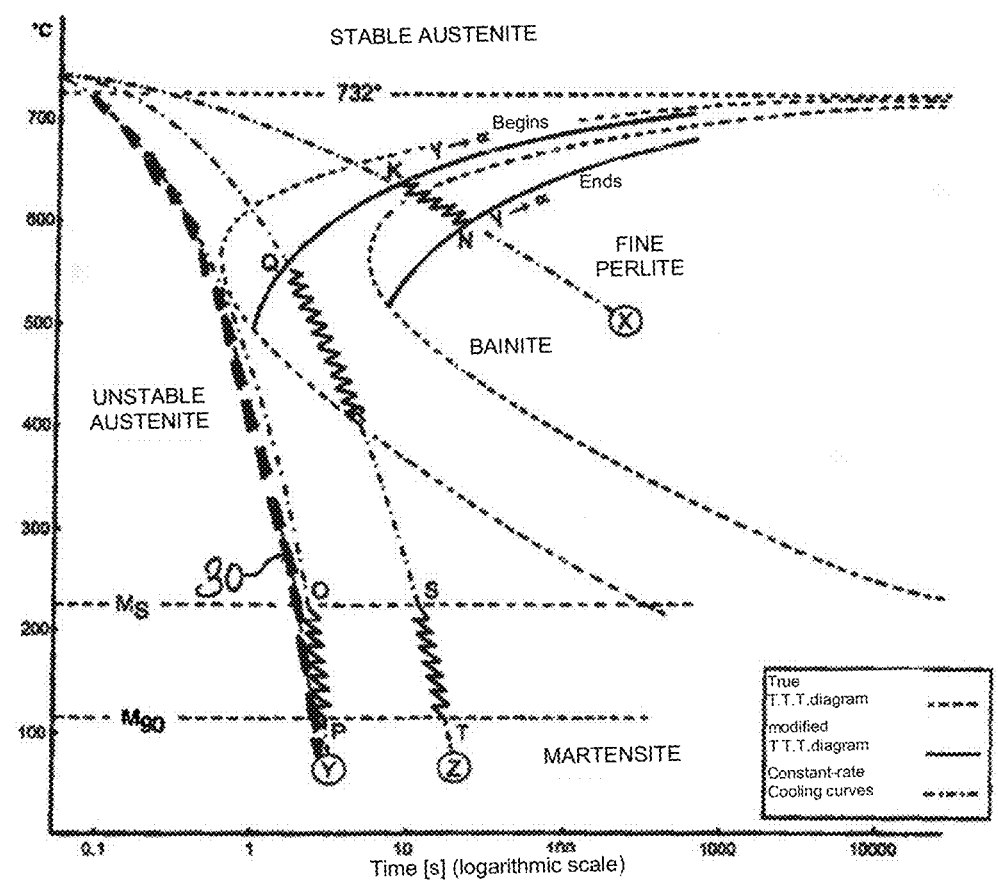
FIG. 2 shows a time-temperature diagram to illustrate the crystal formation.

While the material is briefly heated in the regions to be processed until an austenite lattice is formed, the surrounding material has to be cooled to avoid damage. The time routine determines the transition of the lattice structure and the resulting lattice. The quenching process should therefore adopt a cooling progression such as is marked by the characteristic line 30 in FIG. 2. α-lattice structures can be avoided with the selected temperature progression.

Figure 3:
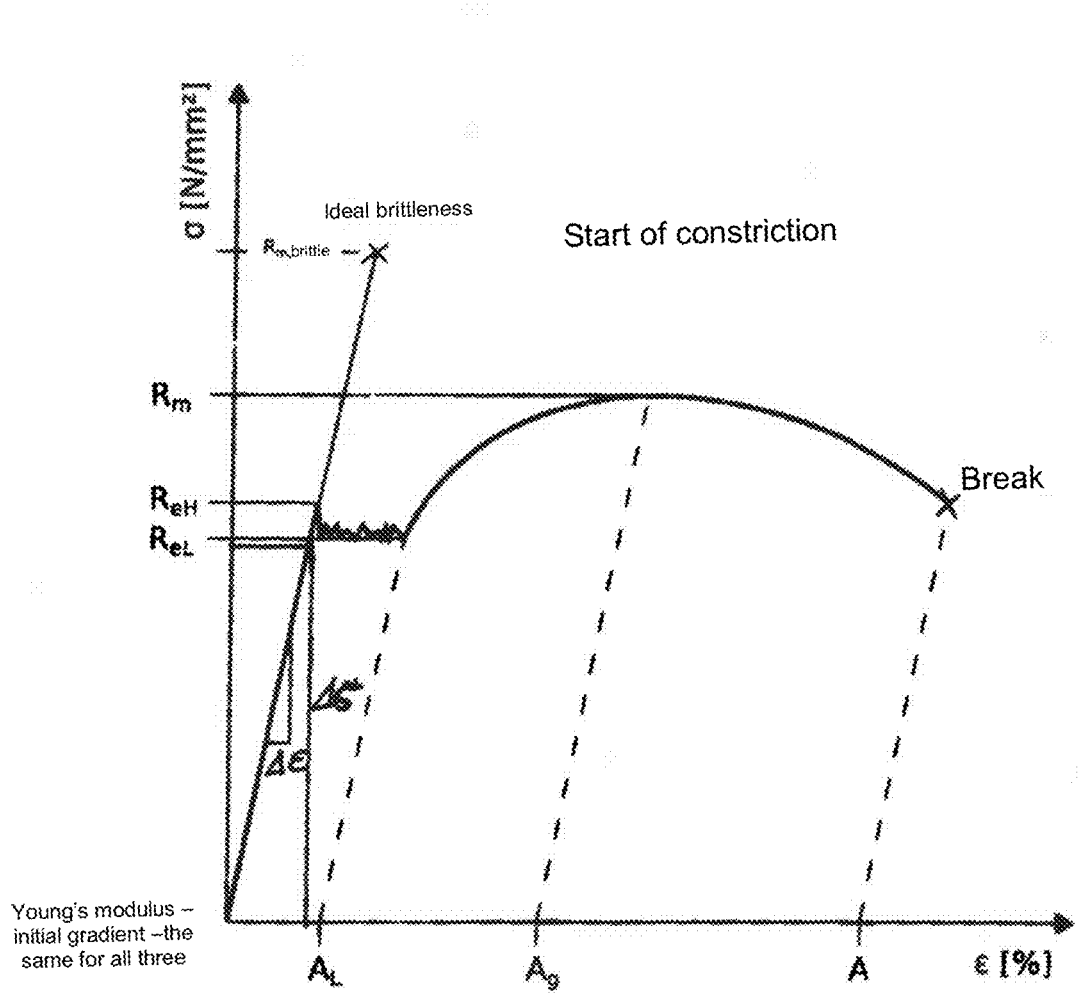
FIG. 3 shows a stress-strain diagram to illustrate the working range of the rotor in accordance with the invention.

The material tends to become harder by the hardening and can be loaded more mechanically. The reduction of the elongation at break is unproblematic since the rotors are loaded within the linear range of the stress-strain diagram (FIG. 3). The rotor can be configured and observed mechanically as before. The treated segments only change the magnetic permeability and thereby reduce the stray flux.

Figure 4:
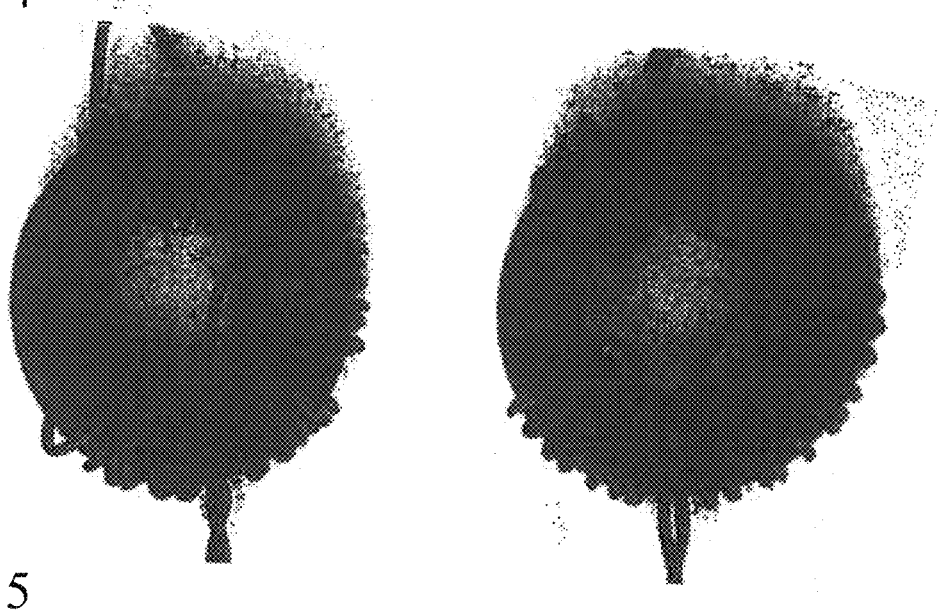
FIG. 4 shows a diagram of the two ring-shaped test pieces.
Figure 6:
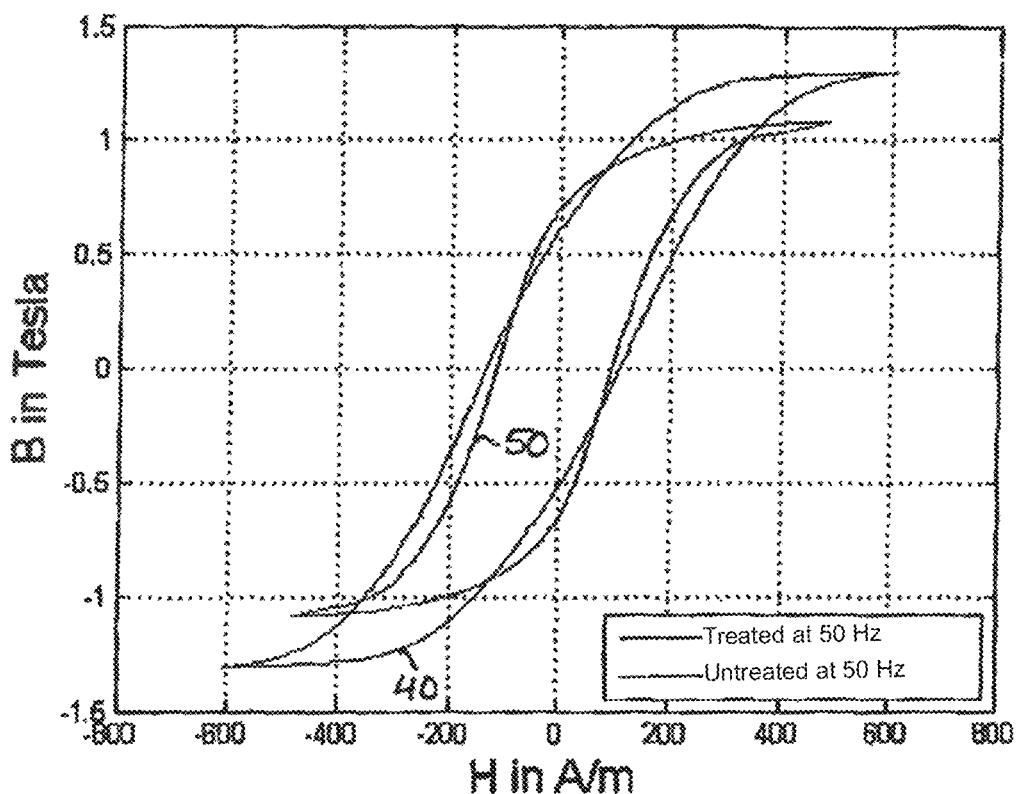
FIG. 6 shows a diagram to illustrate the flux development of the heat-treated and untreated ring-shaped test pieces in accordance with FIG. 4.
Figure 7:
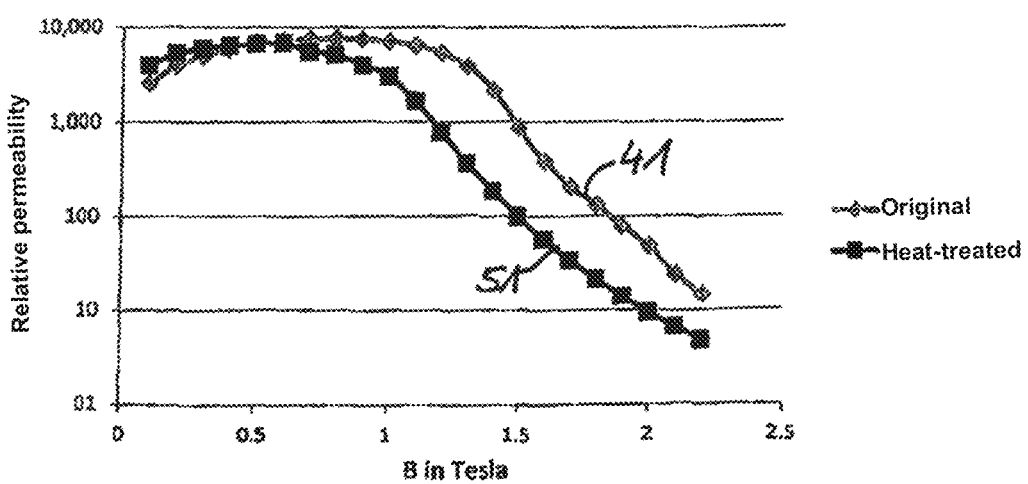
FIG. 7 shows a diagram representation of the relative permeability in dependence on the flux density.

For the evaluation, the magnetic saturation and permeability of two ring-shaped test pieces of an electric sheet M330-35A was measured before and after the thermal treatment. The ring-shaped test pieces are shown in FIG. 4, with the left ring-shaped test piece being untreated and the ring-shaped test piece shown at the right in FIG. 4 having been heat-treated in accordance with the method. The result of the measurement can be seen in FIG. 6. The flux progression of the untreated ring-shaped test piece at 50 Hz is reproduced by the hysteresis curve 40; the progression of the treated ring-shaped test piece is marked by reference numeral 50. It can be recognized that the saturation flux density has reduced by 0.22 T at the shown modulation amplitude. It should be noted for comparison that the minimum of the saturation flux density of cast iron is reached at approximately 0.8 T-1 T. FIG. 7 shows the relative permeability in dependence on the flux density B. In the representation of the Figure, the curve development 41 characterizes the magnetic resistance of the untreated ring-shaped test piece while the curve 51 reflects the magnetic resistance with respect to the flux density B for the treated ring-shaped test piece. A noticeable reduction in the permeability by the thermal treatment is also recognizable here.

Figure 5:
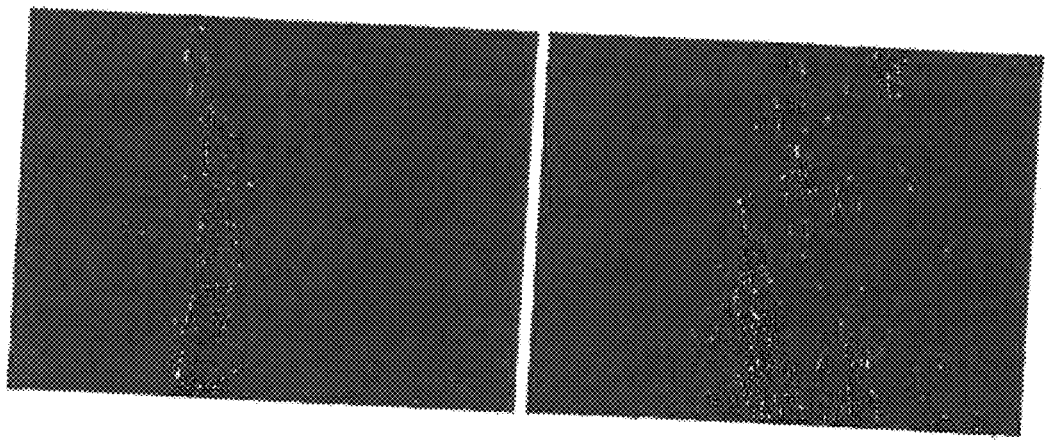
FIG. 5 shows a microscopic photo of a treated/untreated electric sheet.

The ring-shaped test pieces used were cut laterally and ground. The result can be seen in FIG. 5 that shows microscopic photos of the surface structure. The heat-treated metal sheet (right illustration of FIG. 5) shows a clear change of the structure.

Figure 8:
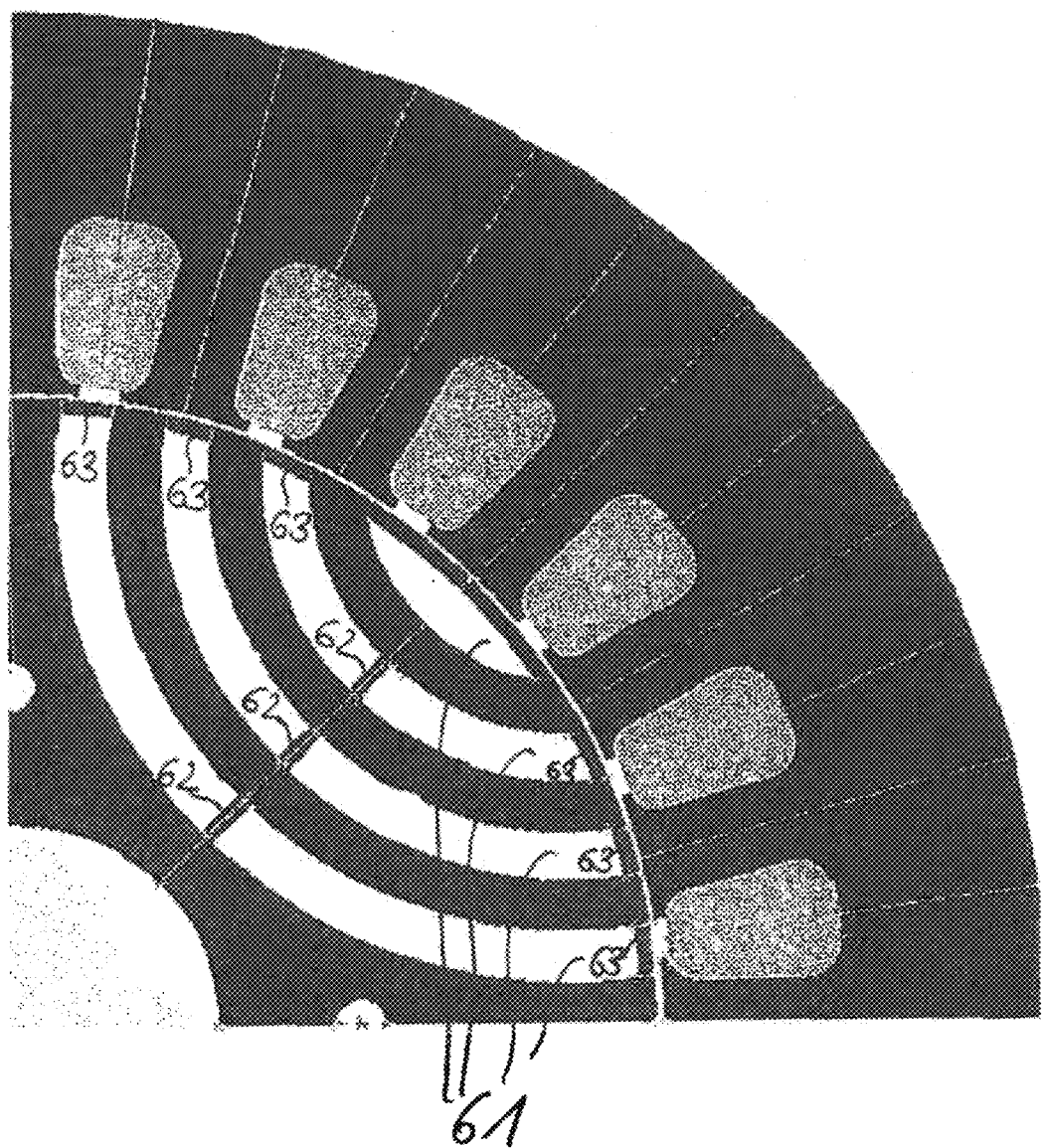
FIG. 8 shows a partial segment of the synchronous reluctance machine in accordance with the invention.

Starting from these material properties, a reluctance synchronous machine with and without these modified webs was now calculated and compared in a finite element simulation. The rotor webs to be treated are illustrated in FIG. 8. The illustration shows a rotor quadrant 60 having a total of four flux barriers 61 per distinctive rotor pole. A part region of the stator 70 is likewise recognizable. The webs 62 are created by a mechanical separation of the innermost flux barriers along the radial axis. In addition, webs 63 are formed at the end side at the flux barrier extent at the rotor periphery. Both the webs 62 and the webs 63 serve the mechanical strengthening of the rotor structure, but disadvantageously form disturbance paths due to their magnetic conductivity.

Figure 9:
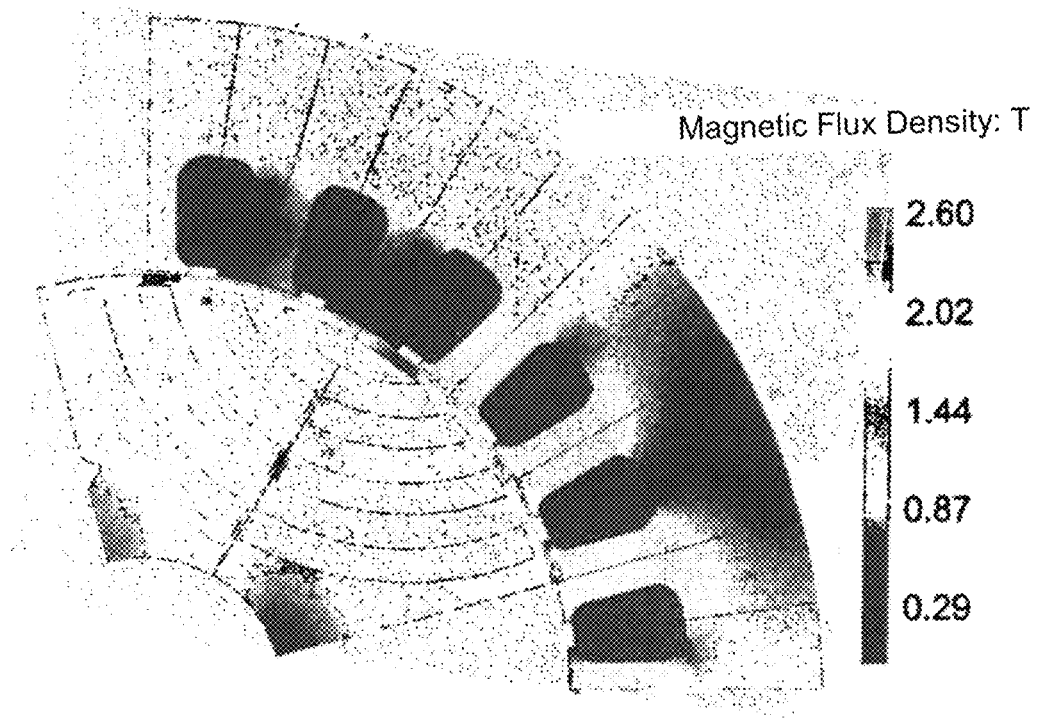
FIG. 9 shows the representation of FIG. 8 with a shaded flux density distribution during machine operation without a previous thermal treatment of the rotor webs.
Figure 10:
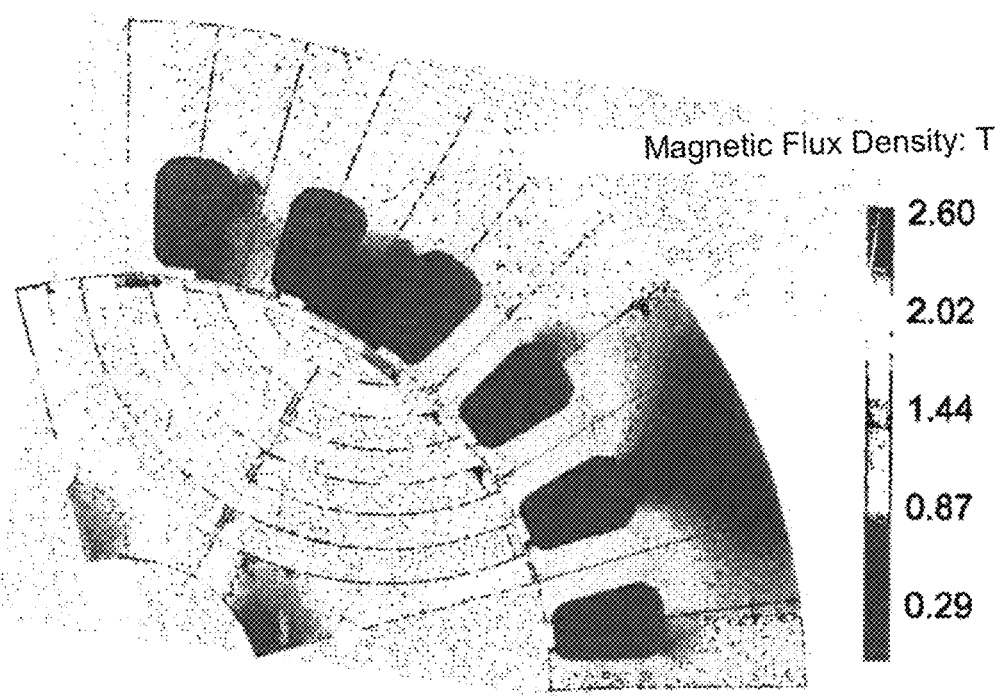
FIG. 10 shows the representation of FIG. 8 with a shaded flux density distribution during machine operation after a successful thermal treatment of the rotor webs.

Two machine cross-sections with an underlying flux density distribution of the identical working point in FIG. 9 and FIG. 10 are shown by way of example in the following. FIG. 9 shows the flux density distribution before the thermal treatment of the rotor of FIG. 8; FIG. 10 shows the flux density distribution after the thermal treatment of the webs 62 and 63. It can be recognized that the webs of the treated metal sheet have substantially smaller flux densities than before the treatment, which becomes clear by the darker coloring in the web region. The resulting torque of the rotor increases substantially with a constant current excitation. The torque density/power density is thus greatly increased and the efficiency is elevated.

Figure 11:
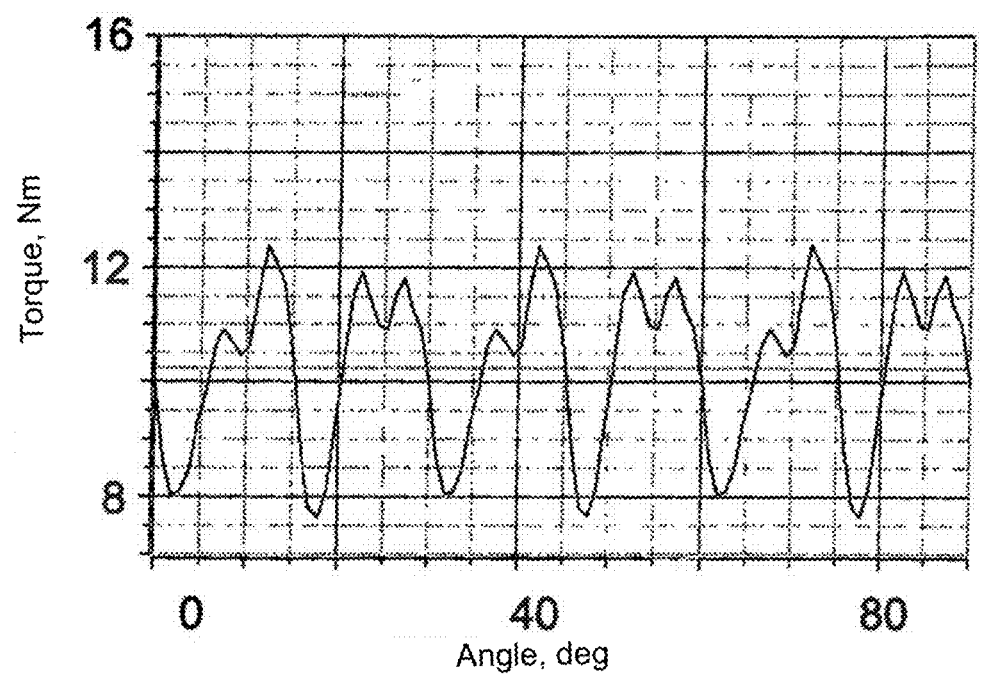
FIG. 11 shows a diagram to illustrate the torque progression of a rotor rotation of the untreated metal sheet in accordance with FIG. 9.
Figure 12:
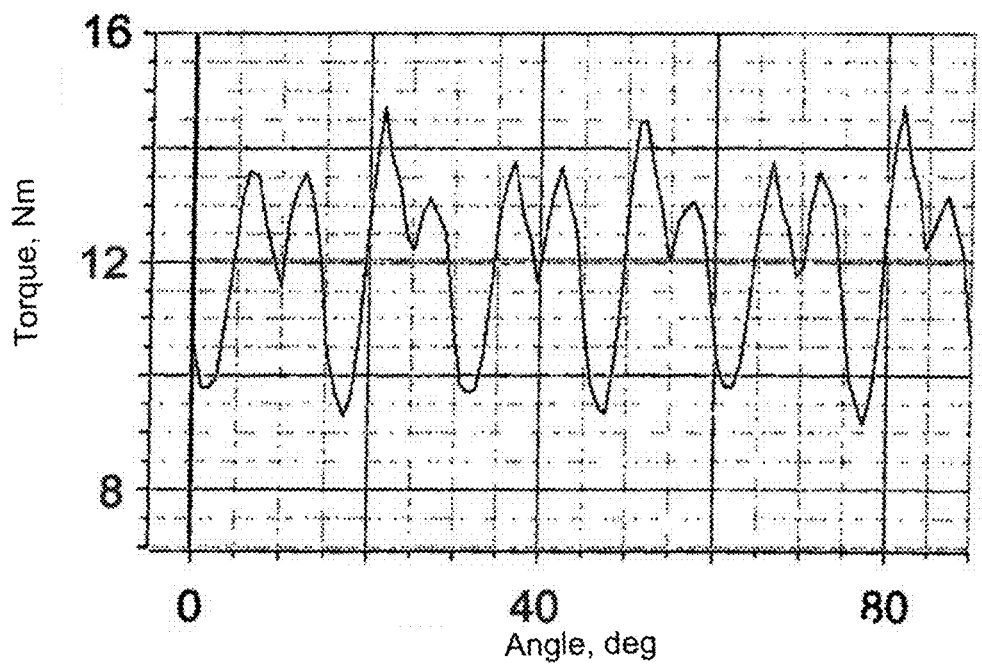
FIG. 12 shows a diagram to illustrate the torque progression of a rotor rotation of the thermally treated metal sheet in accordance with FIG. 10.

The torque of the two machines is shown in FIGS. 11 and 12 over a quarter rotor rotation)(0°-90°, with FIG. 11 showing the torque progression of the untreated rotor and FIG. 12 showing the progression of the treated rotor. The mean value is increased for the rotor geometry from 10.25 Nm to 12.02 Nm. This corresponds to an increase in the mean torque density/power density of more than 17%. The actual level of the power increase depends greatly on the geometry and on the reference design of the machine. However, such an increase for the machine shown would not be conceivable without a treatment of the metal sheet.

The method in accordance with the invention cannot only be used in rotors for synchronous reluctance machines, bur likewise for other machine types, for example for a synchronous machine or an asynchronous machine.

Subharmonic field components can also arise due to the magnetomotive force (MMF) distribution with synchronous machines having concentrated windings such as with a 12 slot/10 pole machine. This generally applies to synchronous machines in which the result of the equation $$n/(t \cdot m)$$

is an even number, where t is the greatest common divisor of the number of slots n and of the number of the poles p and m represents the number of phases. These machines generate high losses in the rotor due to the high penetration depth in the material at a low frequency. The magnetic losses are specifically decisively determined hereby. To avoid losses, flux barriers can be worked into the stator that substantially reduce the subharmonic field components. A method of segmenting and reducing subharmonic field components is already known from DE 10 2008 054 284 A1.

Figure 13:
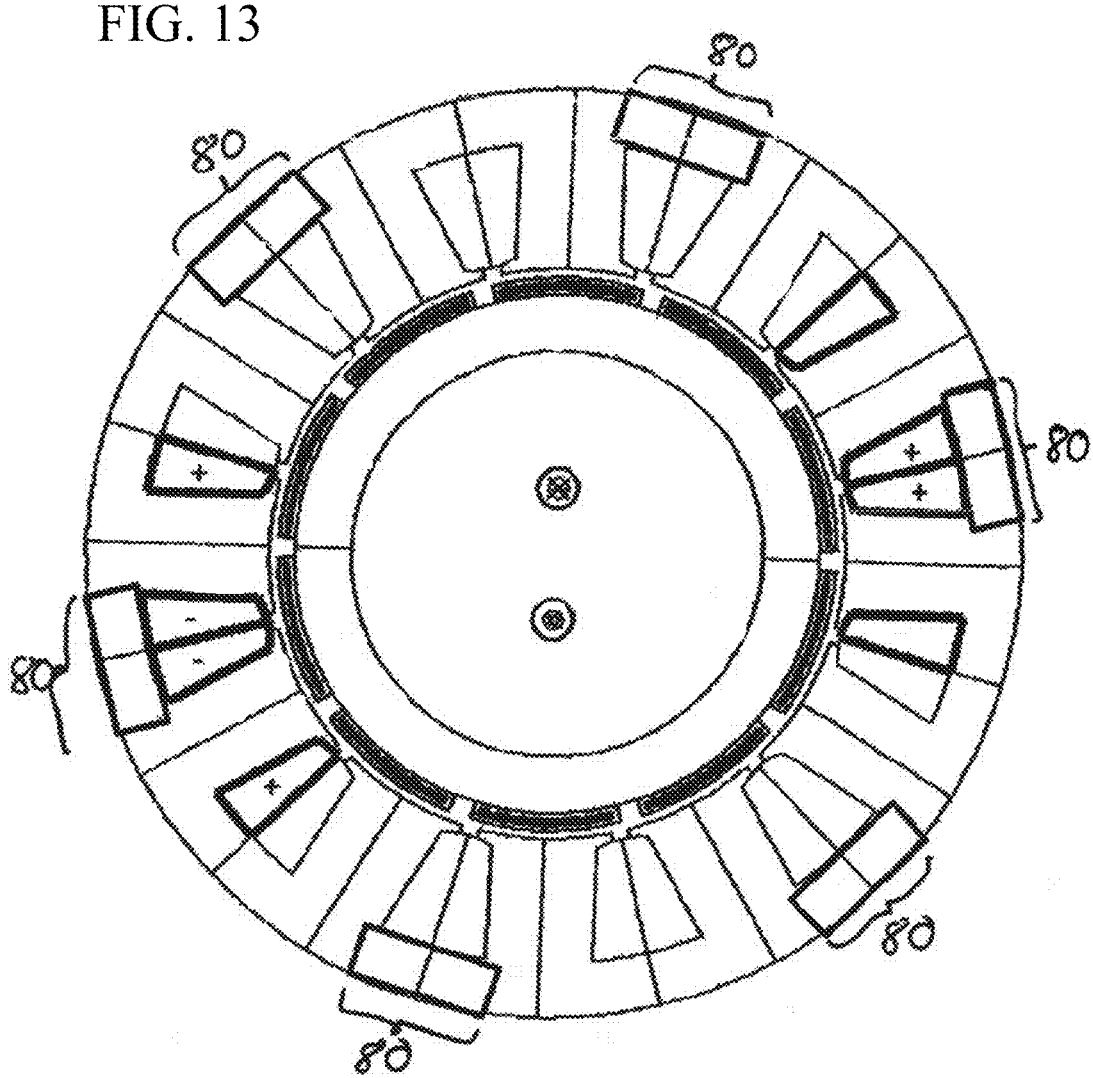
FIG. 13 shows a representation of a synchronous machine having 12 slots and 10 poles.

The previously described segmentation processes can be replaced with a thermal treatment by the method in accordance with the invention. The improvement becomes less powerful, but will nevertheless have a substantial effect with respect to an untreated metal sheet. The regions of the rotor for a synchronous machine to be treated are marked by markings 80 in FIG. 13; the rotor regions at the periphery are in particular treated.

Figure 14B:
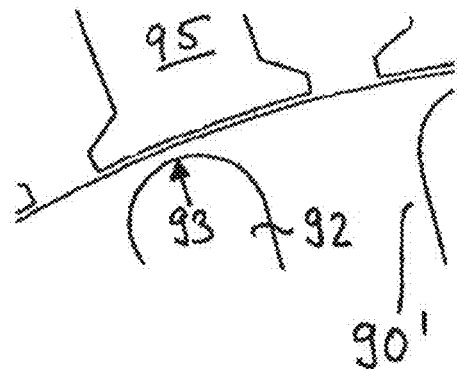
FIGS. 14A and 14B show detail of a rotor of an asynchronous machine with a closed and with an open rotor slot.
Figure 14A:
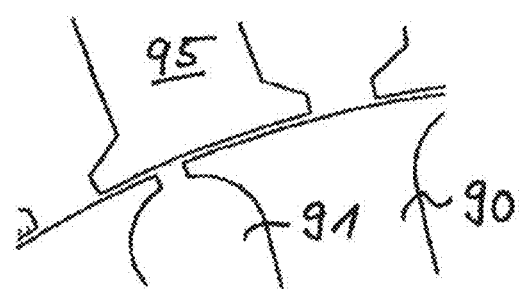

Unwanted stray fluxes can likewise occur with specific rotor geometries for asynchronous machines, in particular with designs in which the required conductors are received by rotor slots that are closed due to the mechanical and/or production technical necessity. The details of FIGS. 14A and 14B show two variants of such a rotor. A detail of the stator 95 and of the rotor 90, 90' can be recognized. FIG. 14A shows an open slot 91, while the rotor model 90' of FIG. 14B is designed with a closed slot 92. The variant of FIG. 14B is in particular used with machines of smaller performance classes to simplify the introduction of the conductors by an injection molding method using aluminum. In addition, a closed rotor slot 92 increases the mechanical strength that is in particular required for machines of high speeds such as spindle drives or cutters.

A closed rotor slot 92, however, also disadvantageously increases the stray flux of the field in an electromechanical manner in comparison with open rotor slots 91, in particular by the resulting web 93 that the closed slot 92 forms. The breakdown torque of the asynchronous machine is disadvantageously reduced by the stray flux. The stray flux can be minimized by a thermal treatment of the magnetic material at the web points 93 to obtain a characteristic similar to the design with open rotor slots 91.

The invention claimed is:

1. A method of manufacturing a rotor for an electric machine, wherein the rotor is composed of at least one electric sheet and the electric sheet is thermally treated regionally to directly modify its magnetic permeability in the treated region, and
wherein, to avoid damage to rotor structure not being thermally treated, rotor sections adjacent to the treated region are cooled during the thermal treatment so as not to modify the magnetic permeability of the adjacent rotor sections.

2. The method in accordance with claim 1, wherein the electric sheet is heated over a predefined period of time to change a crystal structure of the electric sheet in the treated region and is subsequently cooled to bring about a stable lattice state.

3. The method in accordance with claim 2, wherein the electric sheet is heated by means of induction heating.

4. The method in accordance with claim 2, wherein the electric sheet is heated by means of a flame.

5. The method in accordance with claim 2, wherein the electric sheet is heated by means of resistive heating by supplying electrical energy.

6. The method in accordance with claim 2, wherein the electric sheet is heated by means of direct or indirect contact heat.

7. The method in accordance with claim 2, wherein the treated region is cooled by running through a thermally defined profile.

8. The method in accordance with claim 1, wherein a rotor region to be treated is heated to a predetermined minimum temperature.

9. The method in accordance with claim 8, wherein the alloy is silicon steel and the predetermined minimum temperature is between 900° C. and 1100° C. to convert a crystal structure of the electric sheet into an austenite lattice.

10. The method in accordance with claim 1, wherein the electric sheet is provided with flux barriers or slots and at least some of webs of the electric sheet thereby formed are thermally treated.

* * * * *